United States Patent [19]

Lee

[11] Patent Number: 4,962,382
[45] Date of Patent: Oct. 9, 1990

[54] MODIFIED MULTI-CHANNEL BRAGG CELL USING A PHASED ARRAY STRUCTURE FOR THE IMPROVEMENT OF OVERALL EFFICIENCY

[75] Inventor: Jim P. Lee, Nepean, Canada

[73] Assignee: Her Majesty the Queen as represented by the Minister of National Defence of Her Majesty's Canadian Government, Ottawa, Canada

[21] Appl. No.: 322,379

[22] Filed: Mar. 13, 1989

[30] Foreign Application Priority Data

Mar. 18, 1988 [CA] Canada .................................. 561917

[51] Int. Cl.$^5$ .............................................. G02F 1/33
[52] U.S. Cl. ...................................... 342/372; 330/4.3
[58] Field of Search ................. 342/372, 54; 330/7.51; 350/358

[56] References Cited

U.S. PATENT DOCUMENTS

| | | | |
|---|---|---|---|
| 4,634,230 | 1/1987 | Spezio | 342/54 |
| 4,671,620 | 6/1987 | Yao | 342/358 |
| 4,802,149 | 1/1989 | Moore | 342/108 |

OTHER PUBLICATIONS

J. P. Y. Lee, "Interferometric Acoustooptic Signal Processor for Simultaneous Direction Finding and Spectrum Analysis", Applied Optics, vol. 22, No. 4, pp. 867–872, Mar. 15, 1983.
L. Bademian, "Parallel-Channel Acousto-Optic Modulation", Optical Engineering, vol. 25, No. 2, pp. 303–308, Feb. 1986.
J. M. Bagshaw and T. F. Willats, "Anisotropic Bragg Cells", the GEC Journal of Research, vol. 2, No. 2, pp. 96–103, 1984.

Primary Examiner—Thomas H. Tarcza
Assistant Examiner—Mark Hellner
Attorney, Agent, or Firm—Michael Zelenka; Robert A. Maikis

[57] ABSTRACT

A high signal reception efficiency, multi-channel Bragg cell is provided for an interferometric acoustooptic signal processor. The Bragg cell comprises a block of acoustooptic material which is illuminated on one block surface by a laser beam. A plurality of sets of electroacoustic transducers are mounted on another surface of the block which is normal to the first block surface and each transducer set is responsive to the output of a different one of a plurality of antennae so that the laser beam is acoustooptically modulated by the signal outputs from the antennae as it passes through the block. The transducers are arranged in a phased array comprising the plurality of transducer sets. A Fourier transform lens receives and focusses the modulated beam from the block to produce a two dimensional display which represents the power spectrum of the antennae outputs as a function of the angles of incidence of the antennae with respect to an incoming electromagnetic wavefront.

11 Claims, 3 Drawing Sheets

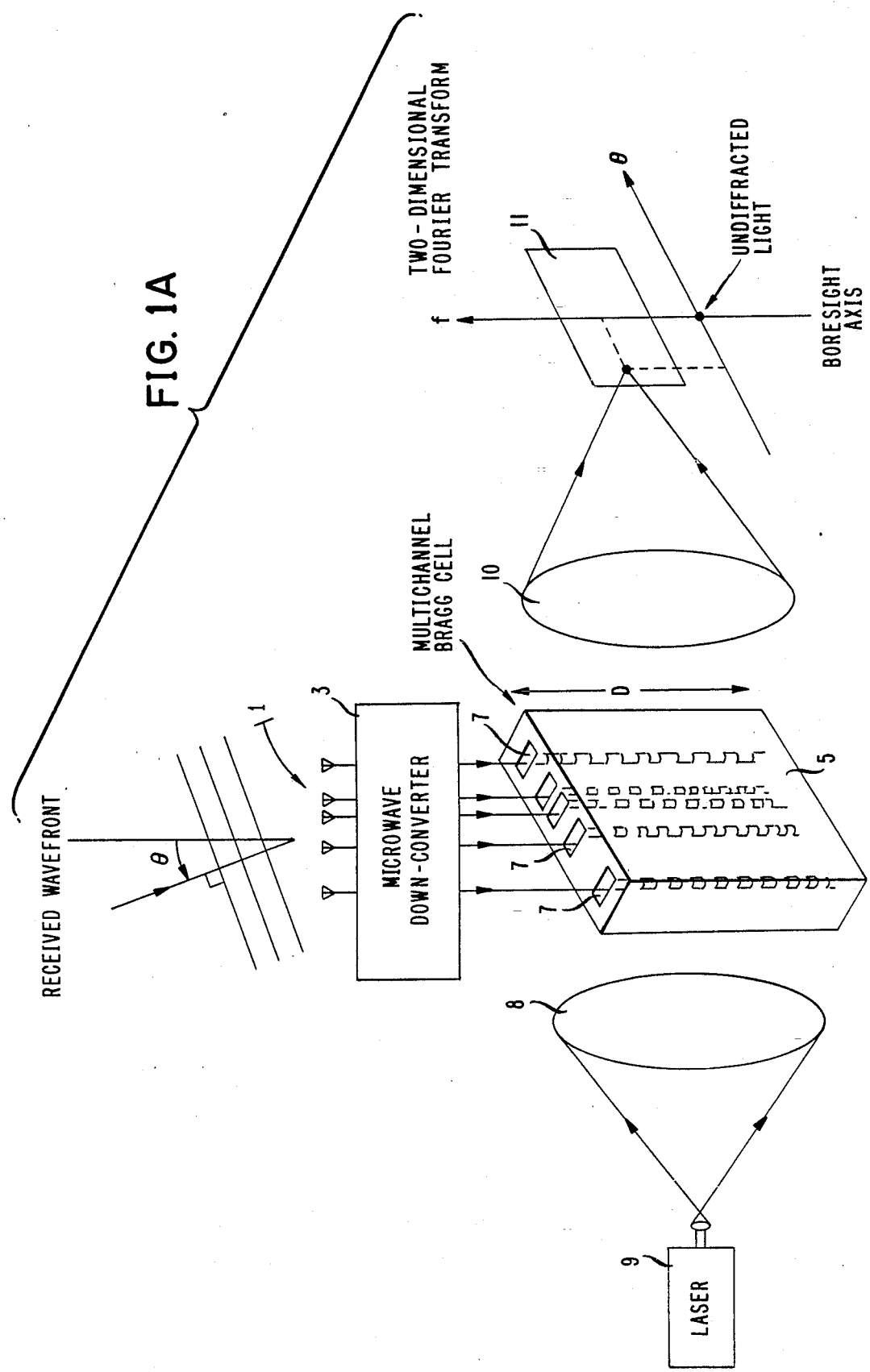

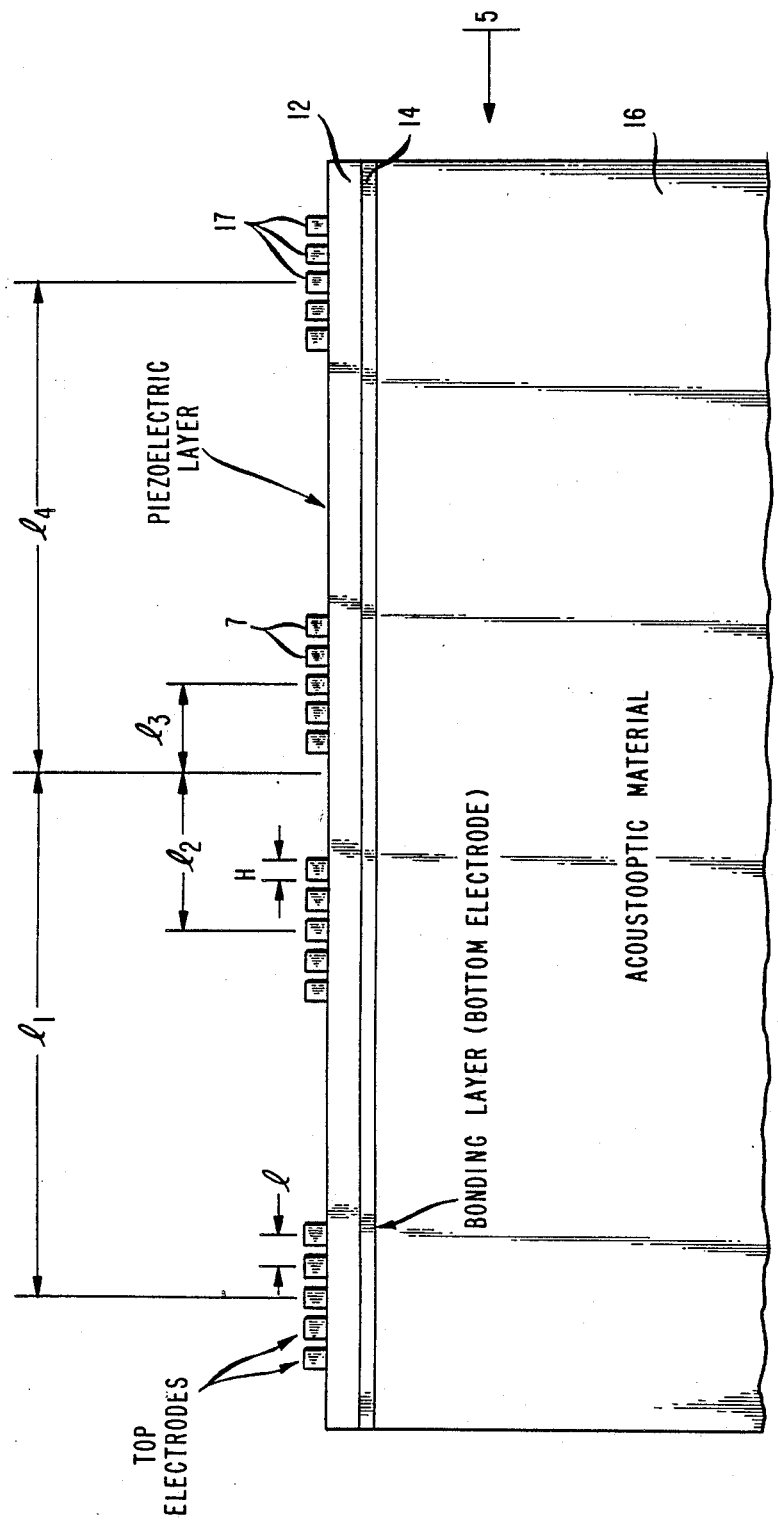

MODIFIED MULTI-CHANNEL BRAGG CELL USING A PHASED ARRAY STRUCTURE FOR THE IMPROVEMENT OF OVERALL EFFICIENCY

BACKGROUND OF THE INVENTION

1. Field of the Invention.

This invention relates in general to optical signal processing, and more particularly to acoustooptic diffraction utilizing a modified multi-channel Bragg cell.

2. Description of the Prior Art

An important objective in the field of radar electronic support measures is the development of wide band radar receivers for real time sorting and identification of incoming simultaneous microwave signals.

One prior art approach to simultaneous signal sorting utilizes an interferometric acoustoopitc signal processor employing a multi-channel Bragg cell. Such a configuration is described in an article by the present inventor J. P. Y. Lee, entitled "Interferometric Acoustooptic Signal Processor For Simultaneous Direction Finding and Spectrum Analysis", Applied Optics, Vol. 22, No. 4, pages 867–872, Mar. 15, 1983.

According to this prior art configuration, an incoming microwave signal is received at a predetermined angle of incidence by a plurality of strategically placed antennae. The received incoming signal is applied to a multi-channel Bragg cell comprised of a plurality of transducers and a block of acoustooptic material. Each transducer is connected to a respective one of the antennae, and the transducer spacing is made proportional to the spacing of the respective antennae. The received signal is applied via the transducers to the block of acoustooptic material, resulting in an acoustic field or wave pattern being generated therein.

A laser beam is used to illuminate the acoustooptic block, and is diffracted due to interaction with the acoustic field generated therein. The diffracted laser beam is then focussed via a Fourier transform lens onto a back focal plane at a predetermined point, defined by Cartesian coordinates in relation to a point of orgin on the focal plane designative of an undiffracted beam. The intensity distribution of the Fourier transform represents the power spectrum of the signal on one axis, and the angle of incidence on the other axis.

This prior art approach has been found to be very useful for microwave signal sorting wherein the incoming signals are spatially separated in frequency and direction of arrival (i.e. angle of incidence). The direction of arrival and frequency resolution are obtained by combining the inherently high angular resolution of an interferometer with the frequency spectral analkysis capability of a Bragg cell receiver.

According to the aforementioned article of J. P. Y. Lee, it was concluded that an aperiodic array with four or five transducers constituted the optimum configuration for a broadband two-dimensional acoustooptic receiver. This conclusion was based on factors such as complexity, cost, required main lobe beamwidth, side lobe level and antenna size.

However, for this optimum configuration it was found that the inter-transducer spacing was required to be much larger than the space occupied by the acoustic transducers themselves. Thus, in the event that the prior art multi-channel Bragg cell is uniformly illuminated by the laser beam, a large portion of the incident light does not interact with the acoustic waves within the cell, even though there may be an appreciable spread in the acoustic wave profile. This has been found to reduce the amount of light diffracted within the Bragg, cell, resulting in a corresponding drop in sensitivity of the receiver.

SUMMARY OF THE INVENTION

According to the present invention, a modified multi-channel Bragg cell is provided utilizing many more acoustic transducers than is provided for in the prior art, arranged in the form of an aperiodic phased array. Instead of feeding a predetermined number of acoustic transducers from a corresponding number of antennae as in the prior art, the present invention utilizes a plurality of sets of acoustic transducers, each set being associated with a respective one of the antennae.

As a result of the transducer arrangement according to the present invention, a larger portion of the incident laser power is utilized constructively within the Bragg cell than in the prior art arrangement, thereby increasing the total amount of light diffracted and improving the efficiency of the receiver.

In general, according to the present invention, there is provided a multi-channel Bragg cell for acoustooptically modulating a beam of light with one or more input signals received via a plurality of antennae. The Bragg cell is comprised of a block of acoustooptic material for receiving and transmitting the beam of light therethrough. A plurality of transducers are connected to the antennae for receiving and applying the input signals to the acoustooptic block such that a plurality of acoustic waves are generated therein for diffracting and thereby modulating the light beam. The transducers are arranged in a phased array comprised of a plurality of sets of transducers, each set being connected to a corresponding one of the antennae. A large portion of the received light beam is modulated as a result of the transducers being arranged in sets, resulting in high signal reception efficiency of the Bragg cell.

According to a preferred embodiment of the present invention, an interferometric acoustooptic signal processor is provided comprised of a plurality of antennae for receiving one or more input signals of predetermined power and characterized by a predetermined angle of incidence in relation to the antennae. A multi-channel Bragg cell is included, comprised of a plurality of transducers arranged in a plurality of sets, each one of the sets being connected to a respective one of the antennae for receiving the input signals, and a block of acoustooptic material connected to the transducers. The input signals received from the antennae are applied to the block such that an acoustic field is created therein. A laser is provided for generating a beam of monochromatic collimated light on the acoustooptic block. The acoustic field interacts with transmission of the light beam through the acoustooptic block, resulting in generation of a diffracted light beam. A Fourier transform lens is included for receiving and focussing the diffracted light beam at a predetermined point on a two-dimensional plane. The predetermined point is characterized by first and second orthogonal coordinates in relation to a point of origin designative of an undiffracted beam. The first coordinate is proportional to the predetermined power spectrum of the input signals, and the second coordinate is proportional to the predetermined angle of incidence. By arranging the tranducers according to the aforementioned plurality of sets, a large portion of the laser light beam incident on the block is diffracted, thereby resulting in high efficiency of signal reception by the Bragg cell receiver.

The nature of the invention and other objects and additional advantages thereof will be more readily understoord by those skilled in the art after consideration of the following detailed description taken in conjunction with the accompanying drawings.

BRIEF DESCRIPTION OF THE DRAWINGS

In the drawings:

FIG. 1A is a block schematic diagram of an interferometric acoustooptic signal processor according to the prior art;

FIG. 3 is an elevation view of a modified four-channel Bragg cell in accordance with a preferred embodiment of the present invention.

DESCRIPTION OF THE PREFERRED EMBODIMENT OF THE INVENTION

Figure 1B:
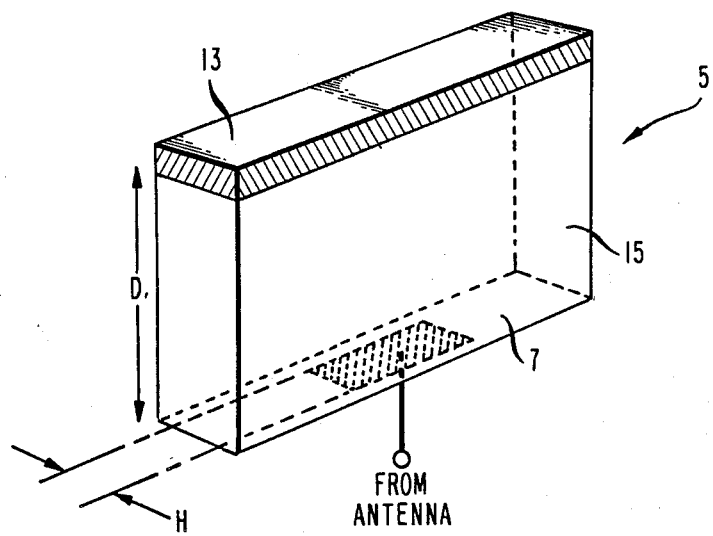
FIG. 1B is a perspective view of a single transducer of the Bragg cell utilized in the prior art interferometric acoustooptic processor of FIG. 1A.

With reference to FIG. 1A, the prior art interferometric acoustooptic signal processor discussed in the prior art publication of J. P. Y. Lee, is illustrated. The signal processor is comprised of a plurality of antennae shown generally as 1, for receiving an incoming microwave signal characterized by an angle of $\theta$ with respect to the antennae 1, and a microwave down converter 3 connected to the antennae 1 for converting the received microwave signal to a plurality of intermediate frequency (IF) signals which are then applied to a multi-channel Bragg cell 5 via a plurality of transducers 7. The ratio of the acoustic transducer spacings are made the same as the spacings between the microwave antennae 1.

Application of the incoming signals to the Bragg cell 5 results in generation of a plurality of acoustic waves therein.

A laser 9 generates a beam of monochromatic light which is expanded and collimated via a beam collimator 8 onto an object plane surface of the Bragg cell 5. As a result of the acoustooptic interaction between the laser beam and the acoustic waves within the Bragg cell, a diffracted light beam is generated within the Bragg cell 5 output therefrom and focussed via a Fourier transform lens 10 onto a back focal plane 11.

The intensity distribution of the Fourier transformed beam is proportional to the power spectrum of the received microwave signal, and is characterized by the f-coordinate on the back plane 11. Similarly, the direction of arrival of the microwave signal is characterized by the $\theta$-coordinate on back plane 11.

Turning to FIG. 1B, a rectangular transducer 7 is shown in greater detail connected to a portion of the acoustoopic material 5 comprising an acoustic column 15 terminated by an acoustic absorber 13. The acoustic column 15 is approximately characterized by an aperture of length (D) and height (H) defining the region of interaction between the collimated laser beam and the internal acoustic field.

It was concluded by J. P. Y. Lee in the aforementioned article that the far field direction of arrival pattern (f(v)) appearing on the backplane 11, is modified by a sinc function related to the angle of incidence ($\theta$), the sinc function being represented as follows:

$$\mathrm{sinc}(vH) = \frac{\sin\left[\pi\left(\frac{d_N H}{\lambda R l_N}\right)\sin\theta\right]}{\pi\left[\frac{d_N H}{\lambda_R l_N}\sin\theta\right]};$$

Where $2d_N$ is the spacing between the outermost antennae 1, $\lambda$ R is the radar signal carrier wavelength, $2l_N$ is the spacing between the outermost two transducers, and v is the spatical frequency coordinate along the direction of arrival axis.

For a scanning angle range of $\theta=\pm 45°$, and meeting the requirement that the sinc (vH) function must not vary by more than 10% from its maximum value of unity, it has been determined that the transducer height (H) must satisfy the equation:

$$H \leq \frac{l_N \lambda_R}{4d_N}.$$

Therefore, for an optimum four-transducer interferometer with a baseline length of $2d_N=10.5\lambda_R$;

$$H \leq 2l_N/42,$$

where $2l_N$ is the total baseline length of the transducer array.

Thus, as discussed above, the inter-transducer spacing ($2l_N-4H$) is seen to be much larger than the space (4H) occupied by the four acoustic transducers. If the prior art multi-channel Bragg cell is uniformly illuminated with laser light, a large portion of the incident light does not interact with the acoustic waves within the cell, even though there may be an appreciable spread in the acoustic beam profile. This has been found to reduce the amount of light diffracted, resulting in a corresponding drop in the sensitivity of the receiver.

For a multi-channel (e.g. N-channel) Bragg cell used in the acoustooptic signal processor of FIG. 1A, receiving a continous wave input signal, and illuminated fully via the laser 9, the instantaneous amplitude distribution in the Fourier plane is given by:

$$U_1(\gamma,\beta) = \frac{NK_b}{\lambda F} DHE(f_{R3}\theta)\mathrm{sinc}\left[\frac{D}{\lambda}\left(\gamma - \frac{\lambda}{\Lambda}\right)\right]$$

$$\mathrm{sinc}(HB/\lambda)\frac{1}{N}\sum_{n=1}^{N} a_n \exp[-j2\pi(\beta l_N/\lambda - \beta_n)];$$

where the time variable has been supressed and the acoustic loss has been neglected, $\Lambda$ is the acoustic wavelength, $\lambda$ is the optical wavelength, E ($f_{R1}$, $\theta$) is the normalized antenna for field pattern, $f_R$ is the radar signal carrier frequency, $Kb^2$ is the acoustooptic diffraction efficiency of the Bragg cell, F is the focal length of lens 10 and $\gamma$ is the angular spatial frequency coordinate along the frequency spectrum axis.

In this case, the normalized far field direction of arrival pattern $f_1$ ($\beta$), is defined by:

$$f_1(\beta) = \mathrm{sinc}\left(\frac{H\beta}{\lambda}\right)\frac{1}{N}\sum_{n=1}^{N} a_n \exp\left[-j2\pi\left(\frac{\beta l_n}{\lambda} - \beta_n\right)\right],$$

where $a_n$ is the amplitude and $\beta_n = \tau_n' f_R$ is the phase delay of the input signal received by the $n^{th}$ channel. $\tau_n'$ is the time delay associated with the signal in channel n and $l_n$ is the position of the $n^{th}$ acoustic transducer on the acoustic transducer array.

The direction of arrival angular spatial frequency is given by $\beta = \lambda v$ (without a subscript), which is related to the direction of arrival information by $\sin(\theta)$.

The number of antennae 1 is equal to the number of acoustic transducers 7, and the ratios of the acoustic transducer separation spacings are the same as those of the microwave antennae.

The modified Bragg cell configuration according to the present invention is illustrated in FIG. 3 according to a preferred embodiment, and utilizes a phased array of acoustic transducers 7 arranged in sets corresponding to respective antennae. For an interferometer with N antennae, there are N phased arrays or sets of transducers 7. Thus, for the example shown in FIG. 3, four sets of transducers are provided for connection to four antennae (not shown).

The phased arrays of the present invention can be designed in many ways, in terms of the transducer-to-transducer spacing, transducer cross-sectional area, number of transducers used in the array, or the excitation phase for each transducer.

For ease of discusion, a simplified example will be discussed herein, wherein N identical phased arrays are considered. Thus, the transducer elements 7 of each phased array have the same cross-sectional area, with a uniform inter-transducer spacing of l. The transducer phase excitation can either be 0 or $\pi$ radians. In this case, the normalized direction of arrival pattern of the modified multi-channel Bragg cell is given by $$f_2(\beta) = \mathrm{sinc}\left(\frac{H\beta}{\lambda}\right)\frac{1}{N}\sum_{n=1}^{N}\sum_{m=-M/2}^{M/2} a_{nm} \exp\left\{-j2\pi\left(\frac{\beta(l_N - ml)}{\lambda} - \beta_n\right)\right\},$$

where the number of transducer elements of the phased array is (M+1), M is an even integer, and the total number of acoustic transducers on the modified multi-channel Bragg cell is N(M+1).

For a given baseline length, the antennae 1 are chosen to be separated from each other as far as possible for ease of fabrication of both the antennae and the acoustic transducers, and in order to reduce mutual coupling effects. In order to avoid overlapping of transducers 7 of adjacent phased arrays, the baseline length and thus the number of transducers of each phased array, must be kept small. On the other hand, a sufficient minimum number of transducers is required since the degree of control over the modified direction of arrival pattern is directly proportional to the number of transducers in the phased array. For a typical broadband Bragg cell reveiver design, a phased array with five acoustic transducers has been found to be a good compromise.

For a symmetrically excited phased array with five acoustic transducers as shown in FIG. 3, $$a_{n,m} = a_{n,-m}$$

and the equation for the direction of arrival pattern $f_2(\beta)$ can be simplified by factoring out the common phased array factor, as follows:

$$f_2(\beta) = [1 + 2P_1 \cos(2\pi\beta l/\lambda) + 2P_2 \cos(4\pi\beta l/\lambda)]\mathrm{sinc}(H\beta/\lambda)$$

$$\frac{1}{N}\sum_{n=1}^{N} a_n \exp\left[-j2\pi\left(\frac{\beta l_n}{\lambda} - \beta_n\right)\right],$$

where $P_1 = \frac{a_{n,1}}{a_n} = \frac{a_{n,-1}}{a_n}$; and $$P_2 = \frac{a_{n,2}}{a_n} = \frac{a_{n,-2}}{a_n}.$$

Comparing the equation for $f_2(\beta)$ to the equation for $f_1(\beta)$ according to the prior art, it can be seen that for the modified Bragg cell configuration of the present invention, the normalized direction of arrival pattern $f_2(\beta)$ is modified by the common phased array factor, and the total weighting function on the direction of arrival array pattern $f_2(\beta)$ is given by $w_1(\beta) = [1 + 2P_1 \cos(2\pi\beta l/\lambda) + 2P_2 \cos(4\lambda\beta l/\lambda)] \mathrm{sinc}(H\beta/\lambda)$.

Thus, there are three parameters, namely $P_1$, $P_2$ and l, which can be varied in order to optimize the weighting function. The two most important optimization criteria in this regard are that the modified Bragg cell must provide a substantial improvement in the intensity of the direction of arrival pattern over prior art systems; and the amplitude of the weighting function must be kept relatively constant with smooth variations over all values of $\beta$ which are of interest in order to preserve the direction of arrival array pattern.

In addition, l must be small enough to avoid overlapping of the transducers from adjacent phased arrays. A small l will also increase the periods of the two cosine terms in the weighting function, giving a smooth weighting function over all values of interest. On the other hand, l must be wide enough to allow two transducers to be placed close together without touching.

As a result, it was found that l = 1.1H is a preferred spacing, where H designates the height of the acoustic transducer. Moreover, for ease of fabrication, transducers of equal phase exitation weigthings of 0 or $\pi$ radians are preferable.

Expressing the total weighting function $w_1(\theta)$ in terms of the scanning angle $\theta$ by making use of the general equation for the sinc function direction of arrival modifier, and meeting the minimum criterior given by $$H \leq \frac{l_N \lambda_R}{4d_N}; \quad W_1(\theta) =$$

$$\{1 + 2P_1 \cos[1.1/2\pi \sin\theta] + 2P_2 \cos[1.1\pi \sin\theta]\}\mathrm{sinc}(\sin\theta/4).$$

Using the above guidelines, a preferred optimum design is obtained with $P_1 = 1$, and $P_2 = -0.38$.

In the preferred case, the center and adjacent transducers of the phased array are excited with equal amplitude and phases of the input signal, and the two outer transducers are excited with a relative amplitude of 0.38 and $\pi$ radians out of phase.

Figure 2:
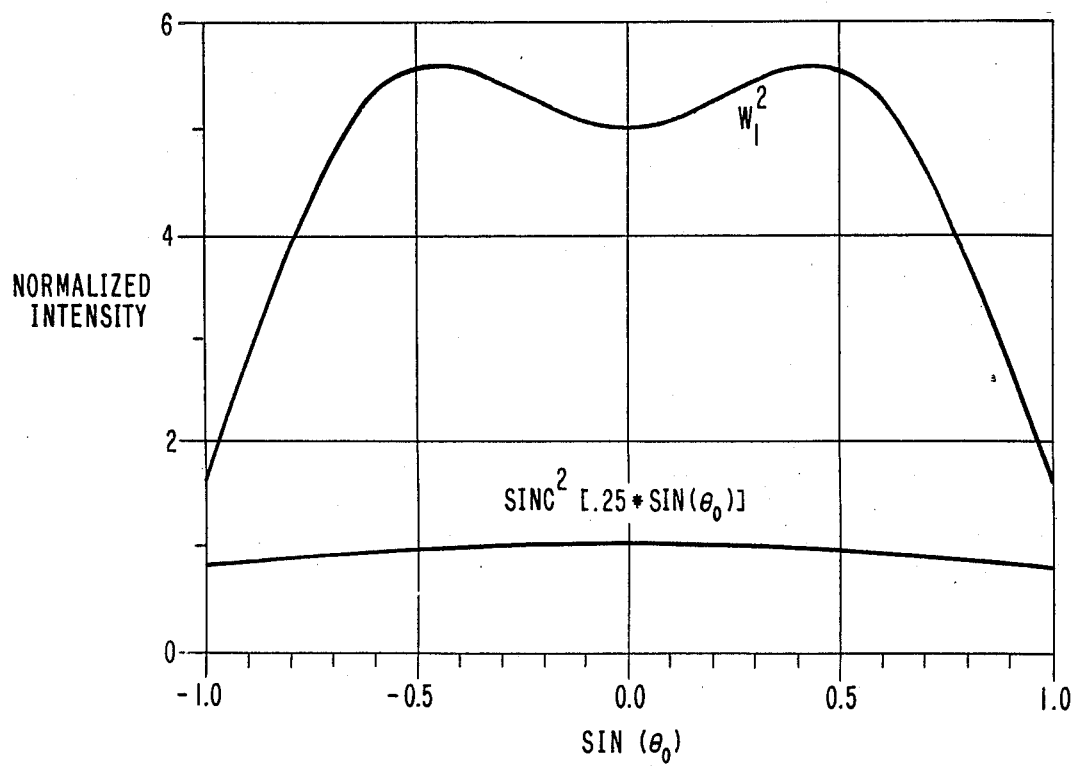
FIG. 2 is a graph of the square of the optimum total weighting function for the modified Bragg cell in accordance with the present invention compared to the sinc function of the unmodified Bragg cell in accordance with the prior art, as a function of the sine of the angle of incidence of a received signal.

The square of the total weighting function ($W_1$) of the modified Bragg cell of the present invention, and the sinc function of the unmodified Bragg cell are plotted in FIG. 2 as a function of $\sin(\theta)$. Comparing the two plots, there is seen to be an improvement in the intensity of the direction of arrival pattern for the modified Bragg cell of the present inventoin over the prior art cell, equal to approximately five times that of the prior art. Two peaks are located symmetrically at $\sin(\theta)=0.445$, and a dip is located at the center. The peaks have a relative intensity of 5.59 times that of the peak of function for the case of the unmodified prior art Bragg cell.

The magnitude of the dip is 90% of the peak value, and at the maximum steering angles of $\theta \pm 45°$ the intensity is reduced to 83% of the peak value. The sinc function is maximum at the center with a value of unity, and at $\theta = \pm 45°$, it falls down to 0.9.

Returning to the modified multi-channel Bragg cell configuration according to the preferred embodiment of FIG. 3, using the optimum design example of a 4-element interferometer (i.e. 4 sets of transducerse, four sets of five transducers are shown deposited on a piezoelectric layer 12 of the Bragg cell 5, where $l_1 = l_4 = 5.25\lambda$, $l_2 = 1.54\lambda$, $l_3 = 0.98\lambda$. A common bottom electrode 14 is deposited on the acoustooptic substrate 16 beneath piezoelectric layer 12.

The pattern of the top electrodes 17 determines the acoustic beam profile, in accordance with the principles of the present invention, whereas the thickness of piezoelectric layer 12 determines the Bragg cell frequency response.

In order to implement an input signal feeding network from the antennae 1 to the top electrodes 17, microwave transmission lines can be used, either in the form of miniature 50$\Omega$ coaxial cables or microstrip lines, in conjunction with impedance matching networks for matching the 50$\Omega$ transmission lines to the low-impedance transducers. The output of the networks are then preferably stitch bonded to the top electrodes of the transducers by means of fine wire.

To implement a reversal in polarity ($\pi$ radians) of the input signal applied to predetermined ones of the transducers, the simplest technique is to interchange the wire bondings of the top and bottom electrodes, ensuring that the ground electrode is isolated from the ground plane.

To implement excitation of the phased arrays on the modified multi-channel Bragg cell according to the present invention, several methods can be used. One method is to use one transmission line with an impedance matching network feeding all five transducers of each set of transducers in parallel. The inner three transducers are then excited with an equal amplitude weighting and phase while the outer two transducers are excited out of phase (i.e. via reversal in the wire bondings). The preferred amplitude weighting of 0.38 may be implemented by metal loading the top electrode.

Another method is to use two transmission lines with their own impedance matching networks. One line can be used to feed the inner three transducers and the other line can feed the outer two transducers. The reversal in sign and amplitude weighting for the two outer transducers can then be implemented externally using well known microwave components.

The structure of the individual transducers shown in FIG. 3 is well known, as described in L. Bademian, "Parallel-Channel Acoustooptic Modulation", Optical Engineering, Vol. 25, No. 2, pp. 303–308, Feb. 1986, and J. M. Bagshaw and T. F. Willats, "Anisotropic Bragg Cells", the GEC Journal of Research, Vol. 2, No. 2, pp. 96–103, 1984. The fabrication of the transducers is also well known, the top electrodes 17 of the transducer array being deposited on the piezoelectric layer 12 using a "lift off" technique, as described in the Bagshaw and Willats article.

A person understanding the present invention may coinceive of other embodiments or variations therein.

For example, while the preferred signal processor application of the modified Bragg cell receives microwave signals via a plurality of antennae, it is contemplated that other input signal sources may be used (e.g. coaxial cable, etc.). Also, as discussed above, the received high frequency microwave signals may be down-converted to intermediate frequency (IF) signals prior to being applied to the Bragg cell, in a well known manner.

Also, whereas the preferred embodiment utilizes a plurality of sets of transducers arranged in a phased array, with each set being identical to the others, it is contemplated that different sets of arrays may be advatageously arranged with different numbers of transducers excited according to different phases of the input signals.

All such embodiments or variations are believed to be within the sphere and scope of the present invention as defined in the claims appended hereto.

What is claimed is:

1. A multi-channel Bragg cell for acoustooptically modulating a beam of light with one or more input signals received via a plurality of antennae, comprised of a block of acoustooptic material on which said beam is used to illuminate the Bragg cell for receiving and transmitting said beam therethrough; and a plurality of transducers connected to said antennae, for receiving and applying said input signals to said block such that a plurality of acoustic waves are generated therein for diffracting and thereby modulating said beam of light, said transducers being arranged in a phased array comprised of a plurality of sets of said transducers, each of said transducer sets being connected to a corresponding one of said antennae and being comprised of five transducers arranged in parallel on said block, each of said transducers being of predetermined height and uniformly spaced from one another by a distance of approximately one and one tenth said predetermined height, whereby a large portion of said received beam is modulated, thereby resulting in high signal reception efficiency of said Bragg cell.

2. A multi-channel Bragg cell as claimed in claim 1, further comprised of means for applying said one or more input signals to the innermost three of said five transducers at a first predetermined amplitude and phase, and to the outermost two of said five transducers at a second predetermined amplitude and phase.

3. A multi-channel Bragg cell as claimed in claim 2 wherein said second predetermined amplitude is approximately 0.38 times said first predetermined amplitude, and said second predetermined phase lags said first predetermined phase by approximately 180°.

4. A multi-channel Bragg cell as claimed in claim 2, wherein said transducers are further comprised of a bonding layer forming a bottom electrode deposited on said block, a piezoelectric layer deposited on said bonding layer, and a plurality of top electrodes deposited on said piezoelectric layer.

5. An interferometric acoustooptic signal processor comprised of:
   (a) a plurality of antennae for receiving one or more input signals each characterized by a predetermined power spectrum and each being received at a predetermined angle of incidence in relation to said antennae,
   (b) a multi-channel Bragg cell receiver comprised of a plurality of transducers arranged in four sets, each of said sets being comprised of five transducers for receiving predetermined amplitudes and phases of said input signals, the innermost three of said transducers of each set being adapted to receive a first predetermined amplitude and phase of said input signals and the outermost two of said transducers of each set being adapted to receive a second predetermined amplitude and phase of said input signals and a block of acoustooptic material connected to said transducers, each one of said sets being connected to a respective one of said antennae for receiving and applying said input signals to said block such that an acoustic field is created therein,
   (c) a laser for generating a beam of monochromatic collimated light on said acoustooptic block, said beam being diffracted within said block due to optical interaction with said acoustic field, and
   (d) a Fourier transform lens for receiving and focussing said diffracted beam at one or more predetermined points on a two-dimensional plane, each of said points being characterized by first and second coordinates in relation to a point of origin designative of an undiffracted beam, said first coordinates being proportional to said predetermined power spectrum and said second coordinates being proportional to said predetermined angle of incidence, whereby a large portion of the laser light beam incident on said block is diffracted as a result of said transducers being arranged in sets, thereby resulting in high efficiency signal reception by said Bragg cell receiver.

6. An interferometric acoustooptic signal processor as claimed in claim 5, wherein said second predetermined amplitude is approximately 0.38 times said first predetermined amplitude, and said second predetermined phase is 180° shifted from said first predetermined phase.

7. An interferometric acoustooptic signal processor comprised of:
   (a) a plurality of antennae for receiving one or more input signals each characterized by a predetermined power spectrum and each being received at a predetermined angle of incidence in relation to said antennae,
   (b) a multi-channel Bragg cell receiver comprised of a plurality of transducers arranged in a predetermined number of sets, said transducers comprising each of said sets being characterized by a predetermined height and being uniformly spaced from one another within each of said sets by a distance equal to approximately 1.1 times said predetermined height, and a block of acoustooptic material connected to said transducers, each one of said sets being connected to a respective one of said antennae for receiving and applying said input signals to said block such that an acoustic field is created therein,
   (c) a laser for generating a beam of monochromatic collimated light on said acoustooptic block, said beam being diffracted within said block due to optical interaction with said acoustic field, and
   (d) a Fourier transform lens for receiving and focussing said diffracted beam at one or more predetermined points on a two-dimensional plane, each of said points being characterized by first and second coordinates in relation to a point of origin designative of an undiffracted beam, said first coordinates being proportional to said predetermined power spectrum and said second coordinates being proportional to said predetermined angle of incidence, whereby a large portion of the laser light beam incident on said block is diffracted as a result of said transducers being arranged in sets, thereby resulting in high efficiency signal reception by said Bragg cell receiver.

8. An interferometric acoustooptic signal processor as claimed in claim 6, wherein said transducers are further comprised of a bonding layer forming a bottom electrode deposited on said block, a piezoelectric layer deposited on said bonding layer, and a plurality of top electrodes deposited on said piesoelectric layer.

9. An interferometric acoustooptic signal processor as claimed in claim 7, wherein said transducers are further comprised of a bonding layer forming a bottom electrode deposited on said block, a piezoelectric layer deposited on said bonding layer, and a plurality of top electrodes deposited on said piezoelectric layer.

10. An interferometric acoustooptic signal processor as claimed in claim 6, wherein said sets are arranged in an aperiodic phased array.

11. An interferometric acoustooptic signal processor as claimed in claim 7, wherein said sets are arranged in an aperiodic phased array.

* * * * *